Patented July 3, 1945

2,379,585

UNITED STATES PATENT OFFICE 2,379,585

SULPHONATION OF BENZENE

James B. Maguire, Jenkintown, Pa., and David F. Gould, Riverton, N. J., assignors to Allied Chemical & Dye Corporation, New York, N. Y., a corporation of New York No Drawing. Application June 30, 1943,
Serial No. 492,902

7 Claims. (Cl. 260—505)

This invention relates to a process for the sulphonation of benzene.

As is well known, production of benzene sulphonic acid by the sulphonation of benzene is an important step in a commercial method for the manufacture of phenol. This sulphonation may be accomplished by causing benzene in either liquid or vapor form to react with sulphuric acid, preferably at elevated temperatures; the most satisfactory commercial method involves passing benzene vapor into a body of hot sulphuric acid, the benzene vapor which passes through the reaction mass unsulphonated serving to remove the water generated by the sulphonation.

Continued practice of vapor-phase sulphonation of benzene had led those skilled in the art to believe that, in order to substantially completely convert the sulphuric acid to benzene sulphonic acid in the relatively short time required for economical commercial operation, high temperatures of the order of 185° to 200° C. must be employed during at least a part of the sulphonation; while these high temperatures do speed up the reaction and effect consumption of the bulk of the sulphuric acid, it has been found that the exposure of a benzene-sulphuric acid reaction mixture to these temperatures for any appreciable time yields a benzene sulphonic acid product containing substantial amounts of diphenyl sulphone or other undesirable by-products which seriously diminish the yield of the desired sulphonic acid and contaminate the reaction products. A process of this type is shown in Tyrer Patent 1,210,725 of January 2, 1917, in which sulphonation of benzene is carried out by passing benzene vapor into sulphuric acid at a temperature of 100° C., increasing the temperature of the reaction mass by about 1° C. per minute until a temperature of 185° C. is attained, and completing the sulphonation by maintaining the temperature of the reaction mass at 185° C. for an additional half hour; however, as pointed out in the Tyrer patent, the yield of benzene sulphonic acid obtained was only 80% based on the sulphuric acid employed, a yield which is far below that required for economical commercial operations.

Another suggested method for carrying out the vapor-phase sulphonation of benzene, disclosed in Ambler Patent 1,300,228, involves passing benzene vapor upwardly through a tower countercurrent to a descending stream of concentrated sulphuric acid maintained at a substantially constant temperature, e. g., 150° C. in the Ambler patent. However, we have found that processes involving countercurrent flow of benzene vapor and sulphuric acid, if sulphonation is carried substantially to completion, invariably yield a product containing excessive amounts of diphenyl sulphone; for example, the passage of benzene vapor countercurrent to a flow of sulphuric acid at 165° C. gave a product containing 3.69% diphenyl sulphone, an excessively high value. Furthermore, it has been our experience that attempts to carry out the vapor-phase sulphonation of benzene at substantially constant temperatures either result in an unduly long reaction time if relatively low temperatures of the order of 150° C. are employed or the production of undesirable quantities of diphenyl sulphone if temperatures of the order of 185° C. or more are used.

It is an object of our invention to provide an improved process for carrying out the vapor-phase sulphonation of benzene to produce benzene sulphonic acid.

It is a specific object of our invention to provide a process for the vapor-phase sulphonation of benzene whereby benzene sulphonic acid substantially free of diphenyl sulphone and having a low residual free sulphuric acid content may be produced in excellent yields in a time suitable for economical commercial operation.

In accordance with this invention, benzene vapor is passed into sulphuric acid at a temperature between about 85° and about 110° C., passage of the vapor continued until the temperature of the mass rises to a peak temperature at least 70° C. above the starting temperature but not higher than about 180° C., and the reaction then completed at temperatures at least 5° C. below the peak temperature and within the range of from about 140° to about 165° C. When the reaction mass has attained its peak temperature and begins to cool, we prefer to control and limit the rate of cooling by superheating the benzene vapors passed therethrough to a degree such that the reaction is completed at temperatures within the 140° to 165° C. range above mentioned; this may be most conveniently accomplished by gradually increasing the superheat of the benzene vapor as the intensity of the reaction subsides until the temperature of the vapor is about 10° C. higher than the temperature at which it is desired to maintain the reaction mass. A preferred embodiment of our invention involves accelerating completion of the sulphonation by maintaining the reaction mass at substantially peak temperature until the reaction mixture contains between about 65% and about 75% by weight benzene sulphonic acid, at the end of which time the temperature of the reaction mass is permitted to fall at least 5° C. below the peak to within the 140° to 165° C. range and the sulphonation then completed.

We have found that by operating in accordance with our invention from about 50% to about 70% by weight of the sulphuric acid is converted to the sulphonic acid by the time the reaction mass has reached its peak temperature, although the time required to accomplish such conversion is less than about one-fourth, and usually less than about one-eighth, of the total reaction time. The remaining sulphuric acid is then converted to benzene sulphonic acid under controlled conditions of temperature whereby excessive formation of diphenyl sulphone is prevented but maximum utilization of sulphuric acid achieved. Thus, by operating in accordance with our invention benzene sulphonic acid products containing no more than 2% by weight diphenyl sulphone are readily obtained in yields of over 90%, based on the sulphuric acid, with no more than about 10% by weight of residual sulphuric acid present in the product. It will be evident, therefore, our invention constitutes a distinct advance over the prior art methods above discussed in which substantially complete reaction of the sulphuric acid was invariably accompanied by formation of considerable amounts of diphenyl sulphone.

In carrying out our invention benzene vapors are passed in any suitable manner into a body of hot sulphuric acid maintained at a temperature between about 85° and about 110° C.; preferably the temperature of the acid into which the benzene vapor is passed is between about 95° and about 110° C. The benzene vapors may be dispersed throughout the acid by passage through distributors beneath the surface thereof. The sulphuric acid employed is preferably concentrated sulphuric acid, e. g. 93% $H_2SO_4$, but, if desired, more dilute acid such as, for example, 85% $H_2SO_4$ may be employed. The benzene vapor may be passed through the acid at any suitable rate of flow, but we have found that a rate of flow not greater than about 1.25 parts by weight of benzene vapor per hour per part of acid is most suitable at the commencement of the sulphonation; preferably, the rate of benzene flow at this stage of the sulphonation is between about 0.6 and about 1.0 parts of benzene vapor per hour per part of acid charge.

The reaction of the benzene vapor with the sulphuric acid begins almost immediately upon contact of the reactants and is accompanied by the liberation of considerable amounts of heat so that, with rates of flow of benzene vapor of the order of those above indicated, the temperature of the reaction mass rises rapidly from the starting temperature to a peak temperature. The time taken to reach this peak temperature may vary somewhat, depending upon several factors, e. g. the rate of flow of benzene vapor, concentration of acid employed and the initial temperature of the acid. Generally, the peak is reached in a time less than about one-fourth, and usually about one-eighth, of the total reaction time. The peak temperature attained should, in accordance with this invention, be at least 70° C. higher than the starting temperature, but temperatures above about 180° C. should not be permitted to develop. When employing a starting temperature within the preferred range of 95° to 110° C. the peak temperature attained will usually be within the range of about 165° to about 180° C.

After the reaction mixture has attained its peak temperature, it tends to cool since loss of heat due to evaporation of the water generated by the reaction and to radiation becomes greater than the heat of reaction, which, as above noted, is usually more than 50% complete and, hence, is beginning to slow down due to the effect of mass action. This cooling should be controlled so that the temperature of the mass falls at least 5° C. but not below 140° C.; the sulphonation may then be completed at a temperature within the range of 140°–165° C., preferably within the range of 155° to 165° C. Control of cooling may be most suitably accomplished by gradually increasing the superheat of the vapor passed through the mass until the temperature of the benzene vapor admitted is about 10° C. higher than the temperature at which it is desired to maintain the sulphonation mass. The increase in temperature of the benzene vapor may conveniently be controlled by means of electrical control devices known to the art, serving to adjust the amount of steam or other heating medium passed to the superheater. Thus, for example, a temperature-responsive element immersed in the sulphonation mass and acting through suitable electrical apparatus and in accordance with a predetermined time-temperature cycle may be made to automatically operate a valve controlling the amount of high-pressure steam or other heating medium admitted to the benzene superheater. It is also desirable to increase the rate of flow of the benzene vapor somewhat after the peak temperature has been reached, e. g. to between about 1.0 and about 1.25 parts by weight of benzene vapor per hour per part of acid, to facilitate removal of the water of reaction and to assist in controlling the rate of cooling.

A preferred embodiment of our invention involves preheating the benzene vapor after the mass has attained its peak temperature to a temperature within the range of 170° to 180° C. so that the temperature of the reaction mass is maintained at substantially peak temperature until the reaction mixture contains approximately 65% to 75% by weight of benzene sulphonic acid. By thus maintaining the reaction mixture at substantially peak temperature, we have found the total reaction time may be appreciably shortened and the over-all economy of the process thereby improved.

As hereinabove pointed out, sulphonation of the benzene, in accordance with this invention, is completed at a temperature at least 5° C. below the peak temperature attained and between 140° and 165° C., preferably between 155° and 165° C. By completing the sulphonation at such temperatures, we have found maximum utilization of the sulphuric acid may be achieved without producing substantial quantities of diphenyl sulphone. Completion of the sulphonation at this temperature generally consumes the bulk of the reaction time. The sulphonation is preferably continued until between about 90% and about 97% by weight of the sulphuric acid has been converted to the desired benzene sulphonic acid, at which point the benzene flow is discontinued.

The following example is illustrative of our invention; amounts are given in parts by weight.

Benzene vapor was passed into 300 parts of 93% sulphuric acid, the initial temperature of the acid being 100° C. and the rate of flow of benzene vapor into the acid being between .6 and .97 part of vapor per hour per part of acid. The temperature of the reaction mixture rose rapidly to a peak of 176° C.; after the temperature had attained this value the mass began to cool. As soon as cooling started the benzene vapor was superheated to a temperature of about 175° C. and the rate of flow thereof into the acid increased to between about 1 and about 1.2 parts of benzene vapor per hour per part of acid; operating in this manner cooling of the reaction mass was halted at a temperature of about 165° C. The mass was then held at approximately this temperature and flow of benzene through the acid continued until the reaction mixture contained only 2% free sulphuric acid. It was found that the product obtained contained 91.5% benzene sulphonic acid and only 1.96% diphenyl sulphone.

Since certain changes may be made in carrying out the above process without departing from the scope of the invention, it is intended that all matter contained in the above description shall be interpreted as illustrative and not in a limiting sense.

This application is a continuation-in-part of our copending application Serial No. 396,966, filed June 6, 1941.

We claim:

1. A process for the sulphonation of benzene which comprises passing benzene vapor into sulphuric acid, the initial temperature of which is between about 85° and about 110° C., continuing passage of the vapor until the temperature of the mass rises to a peak at least 70° C. above the initial temperature of the acid but not higher than about 180° C., and then completing the sulphonation at a temperature at least 5° C. below the peak temperature and within the range of from about 140° to about 165° C.

2. A process for the sulphonation of benzene which comprises passing benzene vapor into sulphuric acid, the initial temperature of which is between about 85° and about 110° C., continuing passage of the vapor until the temperature of the mass rises to a peak at least 70° C. above the initial temperature of the acid but not higher than 180° C., maintaining the reaction mass at substantially peak temperature until it contains from about 65% to about 75% by weight benzene sulphonic acid, and then completing the sulphonation at a temperature at least 5° C. below the peak temperature and within the range of from about 140° to about 165° C.

3. A process for the sulphonation of benzene which comprises passing benzene vapor into sulphuric acid, the initial temperature of which is between about 95° and about 110° C., continuing passage of the vapor until the temperature of the mass rises to a peak at least 70° C. above the initial temperature of the acid and within the range of from about 165° to about 180° C., and then completing the sulphonation at a temperature at least 5° C. below the peak temperature and within the range of from about 155° to about 165° C.

4. A process for the sulphonation of benzene which comprises passing benzene vapor into concentrated sulphuric acid, the initial temperature of which is between about 95° and about 110° C., continuing passage of the vapor until the temperature of the mass rises to a peak at least 70° C. above the initial temperature and within the range of from about 165° to about 180° C., maintaining the reaction mass at substantially peak temperature until it contains from about 65% to about 75% by weight benzene sulphonic acid, and then completing the sulphonation at a temperature at least 5° C. below the peak temperature and within the range of from about 155° to about 165° C.

5. A process for the sulphonation of benzene which comprises passing benzene vapor into sulphuric acid, the initial temperature of which is between about 95° and about 110° C., continuing passage of the vapor until the temperature of the reaction mass rises to a peak at least 70° C. above the initial temperature of the acid and within the range of from about 165° to about 180° C., maintaining the reaction mass at substantially peak temperature by superheating the benzene vapor passing therethrough until the reaction mixture contains between about 65% and about 75% by weight benzene sulphonic acid, and completing the sulphonation at a temperature at least 5° C. below the peak temperature within the range of from about 155° to about 165° C.

6. A process for the sulphonation of benzene which comprises passing benzene vapor into sulphuric acid, the initial temperature of which is between about 95° and about 110° C., continuing passage of the vapor until the temperature of the reaction mass rises to a peak at least 70° C. above the initial temperature of the acid and within the range of from about 165° to about 180° C., at the end of which time approximately 50% to 70% by weight of the sulphuric acid is converted to the sulphonic acid, maintaining the reaction mass at substantially peak temperature by superheating the benzene vapor passing therethrough until the reaction mixture contains between about 65% and about 75% by weight benzene sulphonic acid, and completing the sulphonation at a temperature at least 5° C. below the peak temperature and within the range of from about 155° to about 165° C.

7. A process for the sulphonation of benzene which comprises passing benzene vapor into sulphuric acid, the initial temperature of which is between about 95° and about 110° C., continuing passage of the vapor until the temperature of the reaction mass rises to a peak at least 70° C. above the initial temperature of the acid and within the range of from about 165° to about 180° C., at the end of which time approximately 50% to 70% by weight of the sulphuric acid is converted to the sulphonic acid, maintaining the reaction mass at substantially peak temperature by superheating the benzene vapor passing therethrough until the reaction mixture contains between about 65% and about 75% by weight benzene sulphonic acid, and completing the sulphonation at a temperature at least 5° C. below the peak temperature and within the range of from about 155° to about 165° C., so as to produce a product containing not more than 2% diphenyl sulphone and not more than 10% free sulphuric acid.

JAMES B. MAGUIRE.
DAVID F. GOULD.